United States Patent
Zhang et al.

(10) Patent No.: US 7,177,862 B2
(45) Date of Patent: Feb. 13, 2007

(54) METHOD AND STRUCTURE FOR FEDERATED WEB SERVICE DISCOVERY SEARCH OVER MULTIPLE REGISTRIES WITH RESULT AGGREGATION

(75) Inventors: Liang-Jie Zhang, Cortland Manor, NY (US); Rama Kalyani Tirumala Akkiraju, Yorktown Heights, NY (US); Henry Chang, Scarsdale, NY (US); Tian-Jy Chao, Bedford, NY (US); Jen-Yao Chung, Yorktown Heights, NY (US); David B. Flaxer, Accord, NY (US); Jun-jang Jeng, Armonk, NY (US); Pooja Yadav, Charlotte, NC (US); Qun Zhou, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 302 days.

(21) Appl. No.: 10/107,837

(22) Filed: Mar. 28, 2002

(65) Prior Publication Data

US 2003/0187839 A1 Oct. 2, 2003

(51) Int. Cl.
*G06F 17/30* (2006.01)
*G06F 7/00* (2006.01)
(52) U.S. Cl. .............................. 707/4; 707/10
(58) Field of Classification Search ................ 707/3–5, 707/10, 100, 102, 103 R, 104.1, 101, 103 Y; 709/217, 219, 200, 201, 222, 225; 715/500, 715/501.1, 514
See application file for complete search history.

(56) References Cited

U.S. PATENT DOCUMENTS

| | | | | |
|---|---|---|---|---|
| 5,819,251 A | * | 10/1998 | Kremer et al. ................. 707/1 |
| 5,826,077 A | * | 10/1998 | Blakeley et al. ................ 707/4 |
| 5,918,225 A | * | 6/1999 | White et al. .................... 707/3 |
| 6,134,559 A | * | 10/2000 | Brumme et al. ........ 707/103 R |
| 6,370,541 B1 | | 4/2002 | Chou et al. |
| 6,463,431 B1 | | 10/2002 | Schmitt |
| 6,493,742 B1 | * | 12/2002 | Holland et al. ............. 709/200 |
| 6,598,219 B1 | * | 7/2003 | Lau ............................ 717/108 |
| 6,609,123 B1 | | 8/2003 | Cazemier et al. |
| 6,618,753 B2 | * | 9/2003 | Holland et al. ............. 709/217 |
| 6,721,727 B2 | * | 4/2004 | Chau et al. .................... 707/3 |
| 6,732,084 B1 | * | 5/2004 | Kabra et al. ................... 707/2 |
| 6,748,374 B1 | * | 6/2004 | Madan et al. .................. 707/3 |
| 6,862,590 B2 | * | 3/2005 | Nonko et al. .................. 707/3 |
| 6,871,204 B2 | * | 3/2005 | Krishnaprasad et al. .... 707/102 |
| 2002/0023091 A1 | * | 2/2002 | Silberberg et al. ...... 707/103 Y |
| 2002/0073080 A1 | | 6/2002 | Lipkin |
| 2002/0095430 A1 | | 7/2002 | Egilsson et al. |
| 2003/0110242 A1 | * | 6/2003 | Brown et al. ................ 709/222 |

* cited by examiner

*Primary Examiner*—Greta Robinson
*Assistant Examiner*—Jacques Veillard
(74) *Attorney, Agent, or Firm*—Stephen C. Kaufman, Esq.; McGinn IP Law Group, PLLC

(57) ABSTRACT

A method (and structure) of querying one or more Web-based data sources, includes receiving a query statement including at least one query, parsing the input query to identify a target data source for each query, and dispatching each query to a respective one of the data sources for a target data source search. The query statement further includes an aggregate operator defining at least one logical operation to be performed on a result returned from the target data source searches.

23 Claims, 8 Drawing Sheets

```
<?xml version="1.0" ?>
<!DOCTYPE Search SYSTEM "UDDISearch.dtd">

<Search>
   <ProcessId>9999</ProcessId>
   <Query>
      <Source>Public UDDI</Source>
      <SourceURL>http://uddi.microsoft.com/inquire</SourceURL>
      <BusinessName>IBM</BusinessName>
      <ServiceName>Nasdaq</ServiceName>
      <FindBy>Service</FindBy>
   </Query>

<Query>
      <Source>Public UDDI</Source>
      <SourceURL>http://uddi.microsoft.com/inquire</SourceURL>
      <BusinessName>IBM</BusinessName>
      <FindBy>Business</FindBy>
   </Query>

<Query>
      <Source>Public UDDI</Source>
      <SourceURL>http://uddi.microsoft.com/inquire</SourceURL>
      <ServiceTypeName>http</ServiceTypeName>
      <FindBy>ServiceType</FindBy>
   </Query>

<AggOperator>AND</AggOperator>
   <RequestTypeName>Business</RequestTypeName>
</Search>
```

FIG.2

```
<?xml version="1.0"?>
<!DOCTYPE Search SYSTEM "UDDISearch.dtd">
<Search>
    <ProcessId>9999</ProcessId>
    <Query>
        <Source>Private UDDI</Source>
        <SourceURL>http://9.2.168.233:80/
        services/uddi/inquiryAPI</SourceURL>
        <Category type="NAICS">484122</Category>
        <FindBy>Business</FindBy>
    </Query>
    <Query>
        <Source>Public UDDI</Source>
        <SourceURL>http://uddi.rte.microsoft.com/inquire</SourceURL>
        <ServiceTypeName>OAG</ServiceTypeName>
        <FindBy>ServiceType</FindBy>
    </Query>
    <AggOperator>OR</AggOperator>
</Search>
```

```
<?xml version="1.0"?>
<!DOCTYPE Search SYSTEM "UDDISearch.dtd">
<Search>
    <ProcessId>9999</ProcessId>
    <Query>
        <Source>Private UDDI</Source>
        <SourceURL>http://wsbi10/services/uddi/inquiryAPI/</SourceURL>
        <BusinessName>UPS</BusinessName>
        <FindBy>Business</FindBy>
    </Query>
    <Query>
        <Source>Public UDDI</Source>
        <SourceURL>http://wsbi5/services/uddi/servlet/uddi</SourceURL>
        <BusinessName>KEP</BusinessName>
        <FindBy>Business</FindBy>
    </Query>
    <AggOperator>OR</AggOperator>
</Search>
```

| Business: | Description: | Key: | Operator: |
|---|---|---|---|
| UPS | USA. UPS, or United Parcel Service Inc., is a 93-year-old company whose history spans the bicycle to the Internet. Today the largest express carrier and largest package carrier in the world, UPS continues to develop the frontiers of logistics. | 339CFD70-E84D-11D5-B61C-970107B90C83 | wsbi10/services/uddi |
| KEPEX Fulfillment Center | KEPEX | 8EF91680-EDDA-11D5-ADF1-850C07A41C41 | wsbi5:80/services/uddi |

FIG.5A

```xml
<?xml version="1.0"?>
<USMLResponse>
  <Business>
    <BusinessName>UPS</BusinessName>
    <BusinessKey>339CFD70-E84D-11D5-B61C-970107B90C83</BusinessKey>
    <Description>USA. UPS, or United Parcel Service Inc., is a 93-year-old
      company whose history spans the bicycle to the Internet. Today the
      largest express carrier and largest package carrier in the world,
      UPS continues to develop the frontiers of logistics.
    </Description>
<URL>http://wsbi10/services/uddi/uddiget?businessKey=339CFD70-E84D-11D5-B61C-970107B90C83</URL>
    <Operator>wsbi10/services/uddi</Operator>
  </Business>
  <Business>
    <BusinessName>KEPEX Fullfillment Center</BusinessName>
    <BusinessKey>8EF91680-EDDA-11D5-ADF1-850C07A41C41</BusinessKey>
    <Description>KEPEX</Description>
<URL>http://wsbi5:80uddiget?businessKey=8EF91680-EDDA-11D5-ADF1-850C07A41C41
    </URL>
    <Operator>wsbi5:80/services/uddi</Operator>
  </Business>
</USMResponse>
```

FIG.5B

```
<!ELEMENT UDDISearch (Query+,AggOperator,RequestTypeName?)>
<!ELEMENT Query (Source,SourceURL?,BusinessName?,Identifier?,
Category?,ServiceName?,ServiceTypeName?,DiscoveryURL?,FindBy)>
<!ELEMENT Source (#PCDATA)>
<!ELEMENT SourceURL (#PCDATA)>
<!ELEMENT BusinessName (#PCDATA)>
<!ELEMENT Identifier (#PCDATA)>
<!ATTLIST Identifier type (D-U-N-S|ThomasRegister) #REQUIRED>
<!ELEMENT Category (#PCDATA)>
<!ATTLIST Category type (NAICS|UNSPSC|GEO|UDDITYPE|SIC) #REQUIRED>
<!ELEMENT ServiceName (#PCDATA)>
<!ELEMENT ServiceTypeName (#PCDATA)>
<!ELEMENT DiscoveryURL (#PCDATA)>
<!ELEMENT FindBy (#PCDATA)>
<!ELEMENT AggOperator (#PCDATA)>
<!ELEMENT RequestTypeName (#PCDATA)>
```

FIG. 7

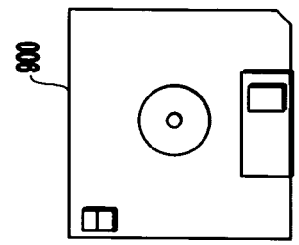
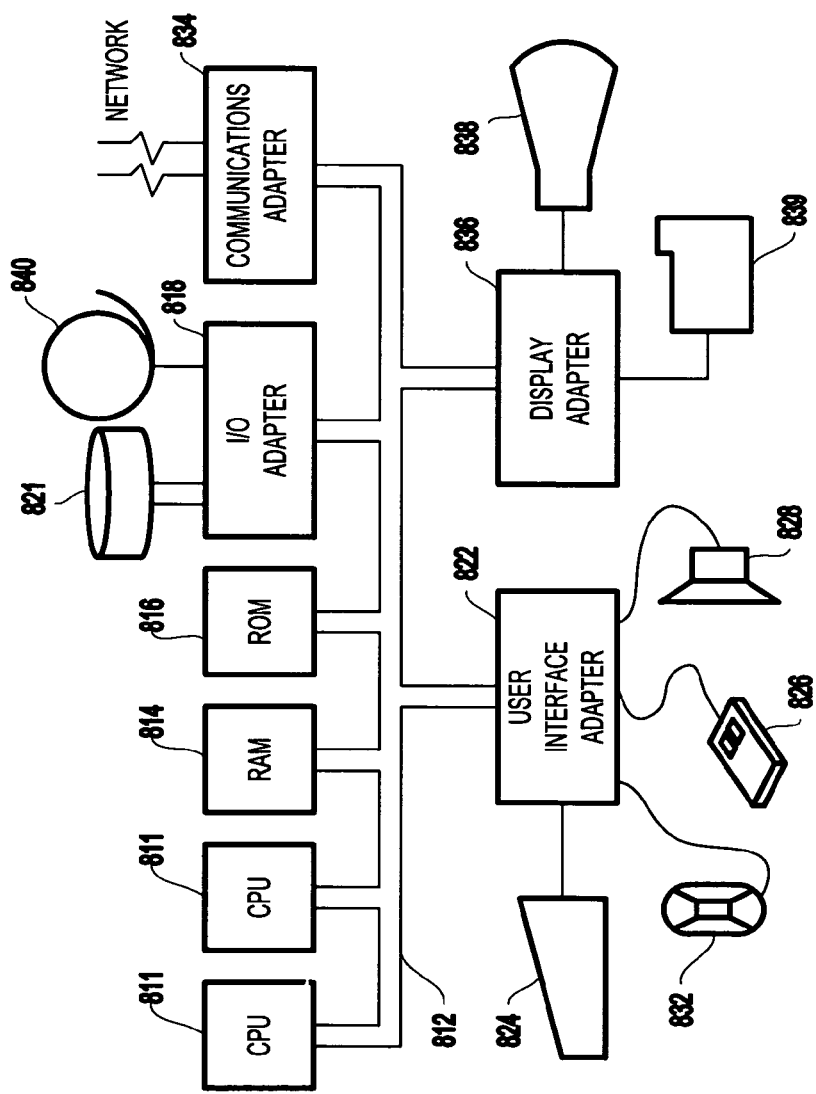
FIG. 9
FIG. 8

METHOD AND STRUCTURE FOR FEDERATED WEB SERVICE DISCOVERY SEARCH OVER MULTIPLE REGISTRIES WITH RESULT AGGREGATION

BACKGROUND OF THE INVENTION

1. Field of the Invention

The present invention generally relates to performing complex searches of Web service Universal Description, Discovery and Integration(UDDI) registries using a single query request. More specifically, a UDDI Search Markup Language (USML) provides a new search format in which a plurality of queries can be dispatched to one or more UDDI registries and the results are processed according to an aggregate operator to provide a federated search result.

2. Description of the Related Art

The emergence of Web Services represents the next evolution of e-business. Web services are Internet-based, modular applications that perform a specific business task while conforming to a defined technical format. This well-described standardized technical format ensures that each of these Internet-based, modular software applications or self-contained business services will easily integrate with other services to create a complete business process. By conforming to a set of adopted standards, Web Services format allows a business to dynamically publish, discover and bind (or invoke, for a user searching the Web services) to a range of services to thereby simplify the process of creating innovative products, business processes and value chains. More information about what Web Services are how they are applied to support electronic commerce and business applications is readily available on the Internet itself at, for example, www-3.ibm.com/software/solutions/webservices.

Exploring efficiently an appropriate business application published as a Web Service in the UDDI registry is a critical issue. Searches for such an application should ideally be effective in terms of time and uniform in terms of interfaces.

Information that describes Web Services are published in public or private registries, called Universal Description, Discovery and Integration (UDDI) registries. The design of UDDI allows enterprises that own Web-Service-enabled applications to publish data about themselves and their services and to voluntarily provide categorization codes on their function. By providing this information, UDDI implements a simplified form of searching for those interested in locating a particular service in which to fulfill an application process. Without categorization, and its ability to associate services to a well-known industry, product or geography, locating data within the UDDI registry would prove to be too difficult.

The conventional UDDI search is focused on single search criteria such as: business name, business location, business categories, business identifier, service type by name and discovery URL. A search invoker, which provides general-purpose query functions to look up UDDI registries, can locate businesses, determine what services they are offering, and interface with them electronically. However, such basic search mechanisms have distinct limitations as described below and are insufficient to support dynamic and rigorous use by applications.

First, general-purpose basic searches of UDDI registries may not yield meaningful results. With a projected near-term population of thousands to a million distinct entities, it is unlikely that such a basic search will yield a result set that is manageable. It is crucial to come up with an efficient search engine for narrowing down to the desired Web Services.

Second, since Web Services are registered to a specific category in UDDI registries, only searches that specify the exact category or categories will find results. However, such specific search criteria may not be known to the search invoker ahead of time. Extending search criteria to include complex logic, to more effectively search a targeted UDDI registry and which will yield the desired results, is an important requirement.

Additionally, all existing UDDI search engines only support one single UDDI registry. For example, Microsoft's UDDI search technology just allows users to search its UDDI registry using one single search criteria. A single search criterion is based on one of the following categories: business name, business location, business category, and service type by name, business identifier, discovery URL. The known taxonomy types include NAICS, UNSPSC, SIC, a geographic code (GEO), etc. The known identifier types include D-U-N-S, Thomas Registry numbers, and Tax ID.

Typically, multiple UDDI registries, public and private, collectively contain services that a search invoker is interested in. Currently, a search invoker must issue multiple, sequential searches on each UDDI to obtain all the possible results. Therefore, the ability to support a federated search, which aggregates the search results from multiple UDDI registries and presents them as a single report, would be quite valuable. The conventional methods also lack the ability to perform the complex search within that single registry. They cannot handle such a request which includes multiple search queries such as findBusiness, findServices and findServiceTypes.

From an e-business application developer's point of view, it is typically necessary to send a few sequential or programmed search commands to UDDI registry for information aggregation. That is to say, the information sources may include multiple UDDI registries and other searchable sources. Obviously, there is a need to provide an advanced search mechanism for Web Services to dramatically extend the current search capability, which is based on categories or key words, through its efficiency improvement and performance enhancement.

Based on the problems stated above, there is a need to extend the basic UDDI search to support searches with complex logic and multiple attributes and to aggregate results from multiple UDDI registries, which is needed by e-business applications.

SUMMARY OF THE INVENTION

In view of the foregoing problems, drawbacks, and disadvantages of the conventional systems, it is an object of the present invention to provide a method (and structure) in which an XML-based Advanced UDDI Search Engine (AUSE) provides an advanced search mechanism for Web Services, wherein the method returns narrow and more meaningful search results with performance enhancements over the conventional methods.

It is another object of the present invention to provide a search engine that supports the need for complex searches such as finding trading partners with products in a certain price range and availability, or finding high quality trading partners with good reputations.

To achieve the above goals and objects, in a first aspect of the present invention, herein is described a method (and structure) of querying one or more Web-based data sources, including receiving a query statement comprising at least one query, parsing the input query to identify a target data source for each query, and dispatching each query to a respective one of the data sources for a target data source search.

In a second aspect of the present invention, also described herein is a signal-bearing medium tangibly embodying a program of machine-readable instructions executable by a digital processing apparatus to provide the system and structure described above.

The present invention provides a method and structure of querying one or more data sources, such as Universal Description, Discovery and Integration (UDDI) registries and Web Service Inspection Language (WSIL) documents for Web Services, including providing a query format comprising at least one query, each query having a format permitting a plurality of search criteria to be contained in a single query to one of the UDDI registries, parsing an input query formatted in the query format to identify a target registry, and dispatching each query to its target UDDI registry in a format appropriate to search the target UDDI registry for the plurality of search criteria with performance improvements.

Preferably, a user receives an instant dispatch acknowledgment. Preferably, one search request is sent for multiple queries and one search response of multiple queries is returned to the user. Preferably, local caching of the predetermined categories best filters and narrows the search results.

Compared to conventional methods, the present invention thus improves considerably the efficiency of conducting queries for one or more Web-based data sources.

BRIEF DESCRIPTION OF THE DRAWINGS

The foregoing and other objects, aspects and advantages will be better understood from the following detailed description of a preferred embodiment of the invention with reference to the drawings, in which:

FIGS. 2 through 4 show exemplary queries to demonstrate possible formats using the USML developed for the present invention;

FIG. 5A shows a presentation of an actual query result of the query command shown in FIG. 4, as presented on an actual software tool embodying the present invention;

FIG. 5B shows the XML response corresponding to the presentation of FIG. 5A;

FIG. 7 is a table of XML elements used in the USML query request, as presented to explain details of the USML;

FIG. 8 illustrates an exemplary hardware/information handling system 800 for incorporating the present invention therein; and FIG. 9 illustrates a signal bearing medium 900 (e.g., storage medium) for storing steps of a program of a method according to the present invention.

DETAILED DESCRIPTION OF A PREFERRED EMBODIMENT OF THE INVENTION

Figure 1:
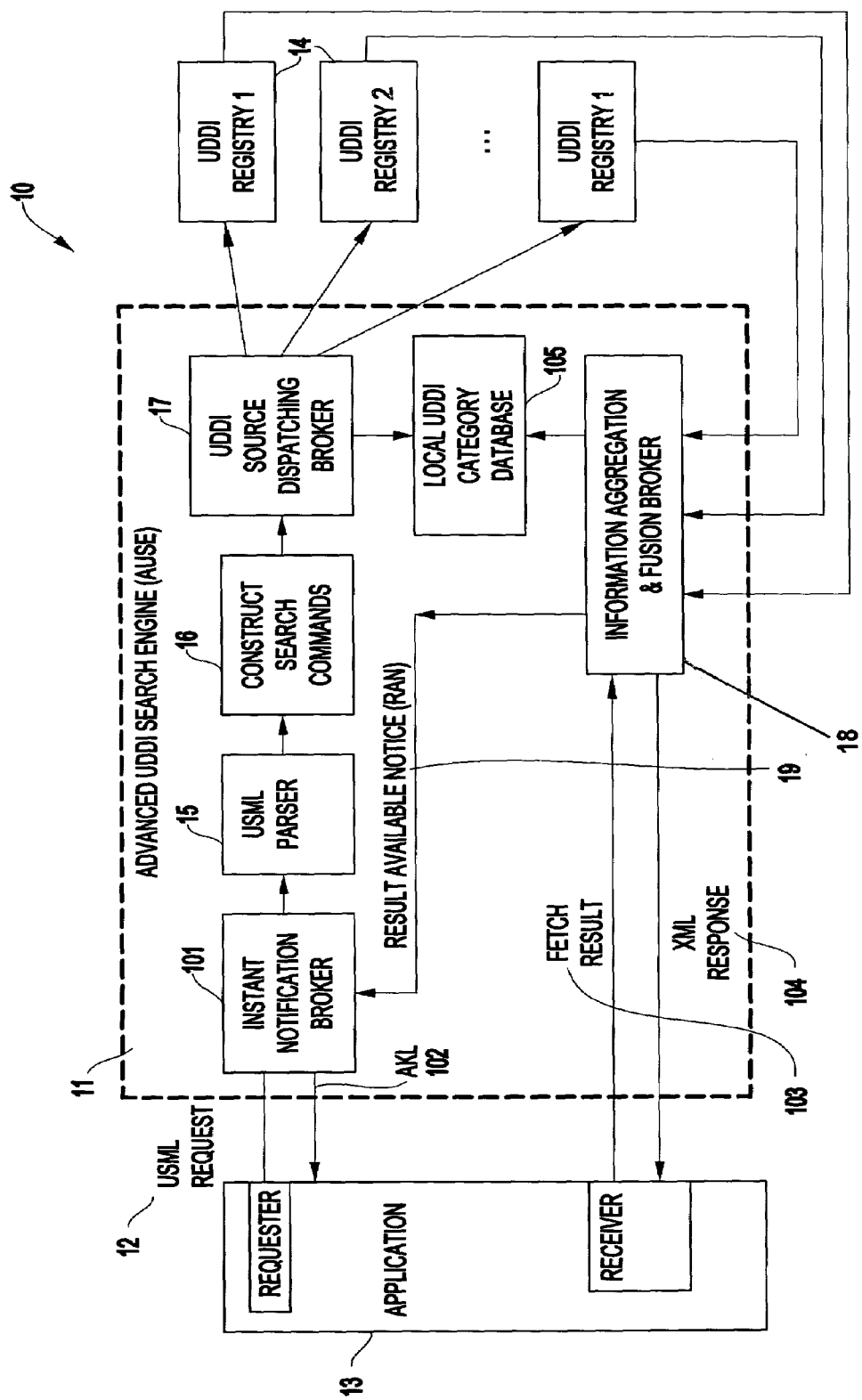
FIG. 1 shows an architecture of an exemplary preferred embodiment of the present invention.

Referring now to the drawings, and more particularly to FIG. 1, an exemplary preferred embodiment will now be described. The present invention includes a method and apparatus for specifying complex search criteria and aggregating search results from different data sources, such as UDDI registries or Web Service Inspection Language (WSIL) documents, efficiently through the use of a new UDDI Search Markup Language (USML) that is described in this patent. The UDDI Search Markup Language (USML) has been defined specifically for use by client business applications (termed as 'service requesters' in this invention) to efficiently search UDDI registries hosted on a server.

Based on the USML query input, an Advanced UDDI Search Engine (AUSE) conducts the searching process. The AUSE can incorporate intelligent search facilities such as a UDDI Source Dispatching Broker and an Information Aggregation Broker, both of which possess prior knowledge of the meanings of specific categories as specified by the search criteria and the ability to cross-reference multiple categories. An exemplary architecture 10 of the present invention, including the Advanced UDDI Search Engine 11, is shown in FIG. 1.

Before describing this architecture in more detail, the following mechanism and ideas are discussed as being key to the enhanced UDDI search capability provided by the present invention. First, a cascading search mechanism is used for refining the search results at different levels of granularity. For example, a filtering mechanism can be applied to the search results that are returned from different data source such as UDDI registries. Service requesters can use USML to define criteria to filter search results. The cascading search mechanism is achieved by an aggregate operator included as a term of the USML query command.

Second, an XML-based UDDI Search Markup Language (USML) was developed to standardize the search query format. This USML dramatically reduces requesting times in a search by reducing the number of requests sent individually to UDDI registries. In essence, the USML provides a basic search invoker that has more complexity than those of the conventional UDDI search methods because of the capability of dispatching multiple query statements in a single search request. Returns for the multiple query statements are subsequently processed according to an aggregation operator included as a term in the search query format that defines a logical operation to be performed on the results.

Thus, a USML-based search request of the present invention incorporates one or more search queries, perhaps more than one UDDI source to be searched, and an aggregation operator. The USML, therefore, supports a complex logical query command that can span across multiple UDDIs, thus alleviating application developers from the details of searching UDDI registries individually and then having to aggregate the results.

As a first USML example, FIG. 2 illustrates a search request 20 having three queries 21, 22, 23 to search three different core UDDI data types (service, business, and serviceType) in the same UDDI registry (Public UDDI) by using the keyword (IBM and http). These results are organized using aggregation operator 24 (AND) as specified in the "Operator" tag.

The second example USML query command 30 shown in FIG. 3 demonstrates that the search requester can create a search of two UDDI registries (Private UDDI and Public UDDI). There are multiple search criteria specified 31, 32, and the results from the different UDDI registries will be aggregated in the OR operator 33.

A third USML example 40 is shown in FIG. 4. Two search queries 41, 42 are given in this sample USML. The first query is defined to look up a private UDDI registry ("wsbi10") based on business name starting with UPS. The second query is defined to look up a public UDDI registry ("wsbi5") based on business name starting with "KEP". Then an aggregation operator "OR" 43 is used to aggregate the search results from these two different UDDI registries. The aggregation result, an actual USML response from a software tool embodying the present invention, is presented in the JSP (Java Server Page) page illustrated in FIG. 5A. FIG. 5B shows the actual query response to the query command shown in FIG. 4.

These three USML sample query requests demonstrate the concept of having multiple queries interconnected by an operator in a single UDDI query request. It should be apparent that the number of queries and complication of the aggregate operator is easily extended from those shown in these examples. Additional details of USML will be discussed after the exemplary architecture is explained.

Figure 6:
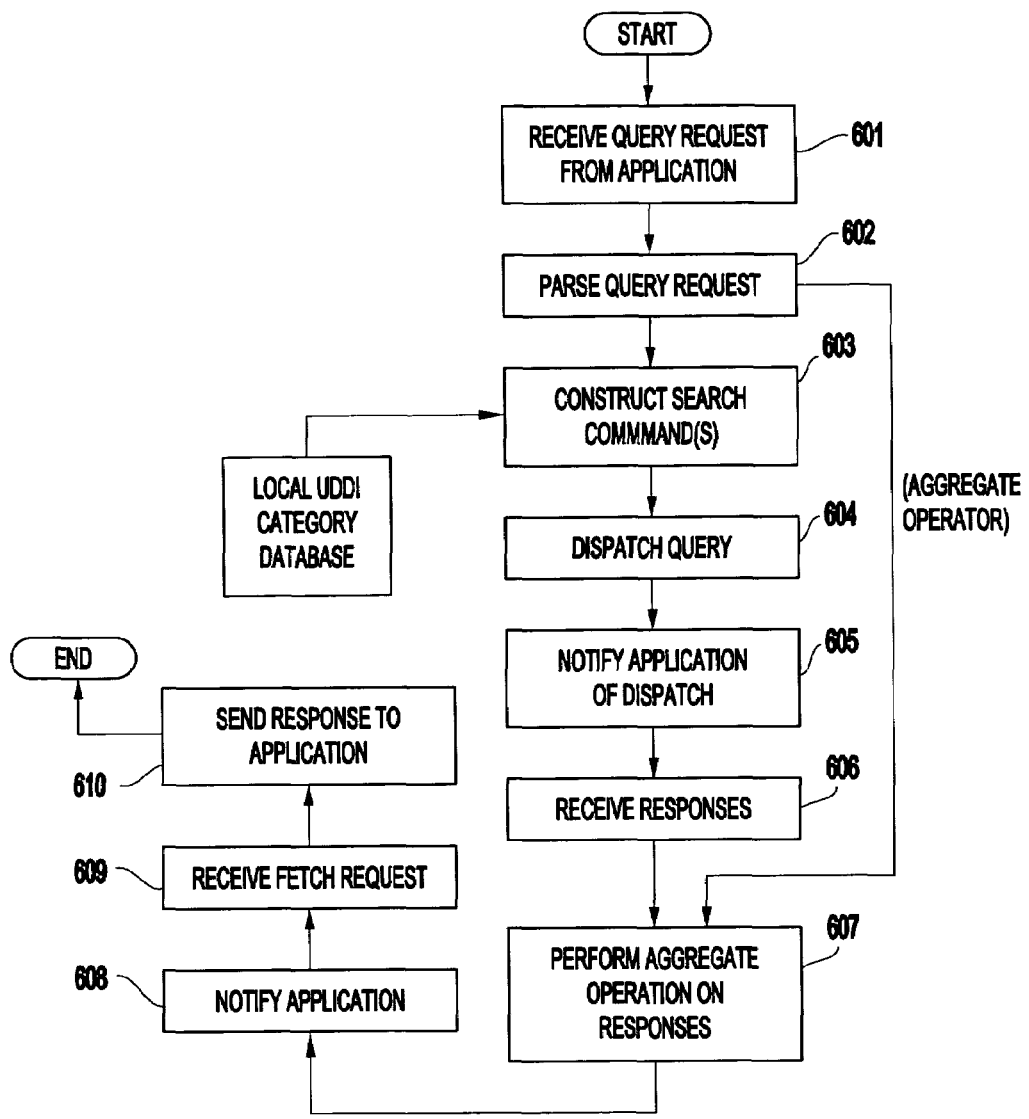
FIG. 6 provides an exemplary flowchart of the embodiment shown in FIG. 1.

Returning now to FIG. 1 and the accompanying flowchart shown in FIG. 6, in step 601 the Advanced UDDI Search Engine (AUSE) 11 receives a USML request 12 from an application 13 software tool. The request is sent to any number of registries 14 after the input request 12 has been parsed by USML parser 15 (step 602), reformatted for the search by Search Command module 16 to prepare the parameters and invoking actual search requests to different UDDI registries (step 603), and dispatched by dispatch broker 17 (step 604).

The result from the individual registry queries is received by the Information Aggregation & Fusion Broker 18 (step 606). The aggregation broker 18 will parse and re-organize the returned results from different UDDI registries based on aggregation operators and rule-based scripts (step 607). The Information Aggregation Broker 18 is used for refining the search results at different levels of granularity by applying the aggregation operator(s) defined in the USML input request. Thus, the aggregation operator enables a filtering mechanism, which is applied to aggregate the search results from different UDDI registries and to narrow results to the most appropriate ones. This feature allows service requesters to use USML to define criteria of filtering and aggregating search results as required.

A search requester is notified by the Result Available Notice (RAN) 19 via the Instant Notification Broker 101, using an acknowledgment notice 102 sent to the application 13. The application 13 can then use a Fetch Result 103 command to retrieve the XML response 104. The final result is represented as an XML response to the search requester, typically using application 13 to display the result as appropriately formatted and shown as an example in FIG. 5.

Instant notification broker 101 communicates with the service requesters and UDDI search service providers. Advanced federated searches can be time-consuming, and the Instant Notice Broker implements an asynchronous notification mechanism. When a search requester sends out a USML-based query 12 to the advanced UDDI search engine, the AUSE will send an acknowledgment 102 to the requester instantly (step 605). After the Information Aggregation broker 18 finishes the aggregation of search results from different UDDI registries, it will send out a Results Available Notice (RAN) 19 to the instant notification broker (INB) 101 (step 608). Then the INB 101 will send the search requester a notice so that the receiver in the application can fetch the results from the AUSE as soon as possible (steps 609, 610).

The UDDI Source Dispatching Broker 17 and Information Aggregation & Fusion Broker 18, both examples have a priori knowledge of the meanings of specific categories and the ability to cross-reference across multiple categories.

The mechanism for cross-referencing multiple categories is by way of the Local UDDI Category Database 105, which is used to efficiently store UDDI categories spanning multiple UDDIs based on a predetermined reorganization. Its primary purpose is to improve UDDI search performance by maintaining a local cache of predetermined category analysis that is used to determine routing of federated searches. It is analogous to a Web search engine that periodically crawls through Web pages recording keywords to be used subsequently. The Local UDDI Category Database 105 may be updated in real-time when a search command is executed, in addition to periodic updates by automatically sending search commands to the available UDDI registries and organize the returned results in a well-formatted way.

The UDDI Source Dispatching Broker 17 intelligently routes federated search commands to various UDDI registries. By consulting the Local UDDI Category Database 105, it selectively dispatches constructed UDDI search commands to the requested UDDI registries specified on the USML query. Further, serving as an intelligent agent, if there is no target UDDI registries specific USML, it might automatically dispatch the UDDI search commands to a best-known UDDI registry based on its experience and intelligence.

Moreover, UDDI searching is a time-consuming process. Therefore, to shorten search response time, in the advanced UDDI Search Engine, the Local Category Database 105 can be used to store and re-organize the UDDI category based on its knowledge and self-updating mechanism. The category data extracted from different UDDI registries and the pointers which link to business details information in UDDI registries can be used by the Local UDDI Category Database, which will be created above the UDDI technical layer.

If a local category source is specified in the USML request, then the Source Dispatching Broker will route the search commands to the local UDDI category database. Of course, one USML request might include multiple search commands defined for multiple sources including Local UDDI Category Database, public UDDI registry and other private UDDI registries. At the same time, the Local UDDI Category Database will be updated in real-time when a search command is executed. Also, it can be updated during a programmed time period by its own updating mechanism, which automatically sends search commands to the available UDDI registries and organizes the returned results in a well-formatted way. The local UDDI database will only store the short description about the business, services, etc. The detailed information is represented by a hyperlink, which points to the UDDI registries.

Network bandwidth is an extremely valuable resource for the networked solution providers and requesters as well as the e-Marketplace. Therefore, from the system point of view, the inventive advanced UDDI search mechanism will dramatically reduce the network traffic resulted from search service requesters by using only one USML-based search request for multiple queries and one XML-based response for all the results. In addition, it simplifies the developer's effort by avoiding having to master the UDDI search programming skills for different UDDI search technologies. Additionally, a quick result can be returned from the advanced UDDI search engine if the local UDDI category database is used.

The Advanced UDDI Search Engine (AUSE) can greatly increase the efficiency of e-business application development. A goal of the advanced UDDI search engine is to support the business-level search facilities for activities such as finding partners with products in a certain price range or availability, or finding high quality partners with good reputations in a quick way. The data in UDDI is not sufficient to accommodate this because of the cross category issues associated with high volumes and voluntary classification.

USML (UDDI Search Markup Language)

Returning now to the USML aspect of the present invention, the USML is an extensible markup language(XML)-based language developed to make the search query format uniform and dramatically reduce requesting times in a search. As already demonstrated, a USML-based search request incorporates multiple search queries, UDDI sources and aggregation operators. Thus, it takes several criteria into account such as keywords to search for, identifiers, categories and so on for the desired search from a single or multiple registries.

As mentioned before, e-business application developers must send a few sequential or programmed search commands to UDDI registries for information aggregation using regular UDDI client package such as UDDI for Java (UDDI4J), an open source project. For information on the UDDI4J and the client package see: www.uddi4j.org/. Hence, the information sources may include multiple UDDI registries and other searchable sources. Therefore, it is essential to provide an advanced search mechanism for Web Services servers to dramatically extend the current search capability, which would provide efficiency improvement and performance enhancement.

USML is beneficial for such an advanced search mechanism with its ability to search on multiple criteria and from multiple registries as opposed to the simple search which searches on a single criteria and on its ability to appropriately target multiple UDDI registries. As an XML-based language, USML will play a significant role in communications across system boundaries.

USML Construction

USML allow an aggregation of different search queries that can potentially search multiple UDDI registries, where each registry can potentially be searched for multiple criteria. A search could be made for Businesses, Service and Service Types matching the different criteria specified in USML by a user. Service Type is also called tModel in UDDI. A tModel specifies information such as the tModel name, the name of the organization that published the tModel, a list of categories that describe the service type, and pointers to technical specifications for the service type such as interface definitions, message formats, message protocols, and security protocols. tModel is essentially a technical "fingerprint" unique to a particular specification.

Document Type Definition (DTD) is a structural description of an XML document. It defines the elements an XML document can have, their attributes, their values and so on. A valid XML document must conform to the specified DTD. As shown in the table of FIG. 7, "UDDISearch.dtd" associated with USML specifies the search criteria.

The following is the description of each XML element in the table.

"Query" specifies the query conditions. It combines keyword search, search based on identifiers, and search based on categories.

"Source" is the name of UDDI source for the query. It can be any name, such as "public UDDI", "private UDDI" or other names.

"SourceURL" is the URL of the source so that an application can access the registry and get related information. This is optional. If sourceURL is not specified in the USML script, the configuration file will be searched for a match source name for its corresponding sourceURL.

"BusinessName" is the name of the business entity.

"Identifier" is the identifier name and its associated value. Two types of identifiers are supported: D-U-N-S, and Thomas Register.

"Category" is the category name and its associated value. Five types of category are supported: NAICS, UNSPSC, GEO, UDDITYPE, and SIC.

"ServiceName" is the name of the service. It is used when the search is by service name.

"ServiceTypeName" is the name of the service type (i.e., tModel). It is used when the search is by the service type.

"DiscoveryURL" is the URL for discovery.

"FindBy" specifies the data type of the result value. There are three data types in UDDI: Business, Service, and ServiceType (tModel).

The following three basic exemplary types of searches for one query are defined: search by name (BusinessName, ServiceName, or ServiceTypeName). The name search is partial match, meaning that the name beginning with the specified value is matched or including the specified value), search by identifier, and search by category. It is possible to combine these basic types. The relationship among these basic types is "AND" if more than one type are specified in one query.

"AggOperator" specifies the logic relationship among queries. Simple AggOperator examples would be a simple "OR" or "AND". If "OR" is specified, all information specified in "FindBy" of each Query is returned. Unlike "AND", "OR" allows as many queries as possible. If "AND" is specified, only information related to the data type specified in RequestTypeName is returned.

"RequestTypeName" specifies the data type name to be returned.

Search for Business

Businesses can be searched using any combination of Keyword, Identifier, Locator, Service Type, and Discovery URL. Only businesses that match all of the criteria specified are returned. At least one of the search criteria should be mentioned.

Searching by BusinessName

The business the user is looking for is specified in the "BusinessName" tag. The businesses with names that start with the characters entered will be returned. In the USML sample above, the search is for the Businesses that start with UPS and hence UPS is written in the BusinessName tag.

Searchin by Identifier

A UDDI Registry allows entities to be annotated with information that uniquely identifies them. Formal identifiers such as Dun & Bradstreet numbers and Thomas Register numbers are fully supported. To search using an identifier, specify the type of identifier in the attribute of the "Identifier" tag and write a value for the identifier.

Searching by Category

A UDDI Registry allows entities to be classified using categorization taxonomies such as North American Industry Classification System (NAICS), Universal Standard Products and Services Classification (UNSPSC), and Geographic (GEO). These classification taxonomies are generically known as 'Locators'. To search using a locator, first specify the type of locator in the attribute of the "Category" tag and then write a value for the category.

Searching by Discovery URL

A Discovery URL represents the address of URL-addressable discovery documents that contain information about a business registered in the UDDI Registry. To search using a discovery URL, specify a value into the "DiscoveryURL" tag. Businesses with discovery URLs that start with the characters you entered will be returned.

Search for Service

A Service using combination of ServiceName and Category can be searched. Only services that match all of the criteria specified are returned. At least one of the search criteria should be given. Since business services depend on business entities, it is virtually impossible to search business services without specifying business names. If searching for business services without business names is necessary, then there is a need to retrieve all business entities registered with a public UDDI or private UDDI, a task which takes too much time. Based on the above consideration, users must also specify the business names for business service search.

Searching by ServiceName

The name of the service the user is looking for is specified in the "ServiceName" tag. The business services with names that start with the characters entered will be returned.

Searching by Category

In order to search the services using a category, the type of category in the attribute of the "Category" tag is first specified and followed by a value for the "Category" element.

Search for Service Type

A search for Service Types using any combination of ServiceTypeName and Category is provided. Only Service Types that match all of the specified criteria are returned. At least one of the search criteria should be given.

Searching by ServiceTypeName

The name of the service type sought is specified in the "ServiceTypeName" tag. The service types with names that start with the characters entered will be returned.

Searching by Category

In order to search using a category, the type of category in the attribute of the "Category" tag is first specified and followed by a value for the category. For example, if the user wants to search for service type that start with S and having category as "NAICS", "NAICS" would be put in the "type" attribute of the Category tag in the USML, and the value "S" in the tag.

Aggregation Operators

The "AggOperator" defined in USML can take different values such as AND, OR, or a function which involves a script to perform a task. The results from different UDDI registries may be required to be aggregated depending on these operators. If the response contains redundant information, it can be filtered by the use of such operators. It should be obvious that the Aggregation Operator could be very simple by using a simple AND or OR, or could be quite involved by using a script.

Every Business is associated with a business key and every Service has a service key. Thus, these operators help to combine the results of different keys and eliminate the repetitive information with the same key.

OR Search Criteria

If the UDDI Registry must be searched for any business, say starting with "IBM" and any service starting with "Web", two separate requests in a regular way have to be made: one for the business and one for the service. Similarly, a request for a service type or another service or a business would require different calls, thus increasing the searching time and effort.

With the help of USML, the search criteria can be combined into one request and thus efficiency in the system is increased by making just one call for all the desired criteria.

AND Search Criteria

If one wishes to search for the service types starting with "Web" and these service types must be used by businesses whose names start with "White", then two queries are able to be specified: one for service type and one for business. "AND" as the AggOperator tag is used and the Service Type is required to be returned. Thus, the "AND" operator is an indicator to aggregate the results obtained from the user's multiple criteria requests.

SCRIPT Search Criteria

Simple aggregation operators such as "AND" or "OR" do not provide sufficient specification for complex aggregation tasks. For example, one may want to apply a complex formula including pattern matching, exclusions, and programming logic to an aggregation which derives a desired result. The user is permitted to define a complex aggregation using a script that contains the programming necessary to accomplish their objectives . The name of this script is specified as a value in the "AggOperator" tag.

To determine the file location of the aggregation script, a configuration file is consulted where script names are mapped with the corresponding URL of the aggregation script source file. The configuration file helps in storing large number of URLs associated with various aggregation scripts. New scripts can be easily added in this file at later stages without the need to modify the rest of the code using this file.

According to the UDDI specification, there are three exemplary core data types that can be queried against: business, service, and service type (tModel). If the aggregation operator is "AND", then the user is required to fill in the value for "RequestTypeName" that specifies one of the three core data types to be returned. For example, if "RequestTypeName" is business, and three queries are specified in an XML document: one for business, one for service, and one for service type, only business information that meets all the requirements specified in these three queries is returned.

There would be a number of possible combinations of an "AND" query. For example, if "Type" is used to refer to "Service Type", and the first part of the following names as "RequestTypeName", possible combinations might be:

BusinessServiceType: AND of all three data types, returns Business

ServiceBusinessType: AND of all three data types, returns Service

TypeBusinessService: AND of all three data types, returns Type

BusinessService: AND of Business and Service, returns Business

ServiceBusiness: AND of Service and Business, returns Service

BusinessType: AND of Business and Type, returns Business

TypeBusiness: AND of Type and Business, returns Type

ServiceType: AND of Service and Type, returns Service

TypeService: AND of Type and Service, returns Type

The semantics of "AND" is easy to understand. For each "AND" query, the intersection of keys got from subqueries must not be empty. For example, if the combination "Type-Business" is used, then the returned service type must be used by at least one business specified in the query for "Business".

Thus, one can search by Businesses, Services and Service Types. The user specifies the source UDDI and the associated URL with which to search. In case the URL is not specified, a default URL associated with the Source name is taken from the configuration file where the Source UDDI names are mapped with the corresponding URLs. A configuration file helps in storing large number of URLs associated with various UDDI Registries. New registries can be easily added in this file at later stages without the need to modify the rest of the code using this file.

Thus far, the invention describes a method (and system) to perform a search across one or more registries, and in the case where multiple registries are included in the search, the results are aggregated together into a single response. There is nothing to preclude the support of aggregation operators within the search of a single UDDI registry. In this case, aggregation operators, "AND", "OR" and "SCRIPT" may be applied to a search in a single UDDI. In fact, the AND AggOperator is applied by default. For a search request, the concept of aggregation within an instance of a UDDI registry which is then aggregated together with the search results of multiple registries, is called multilevel aggregation.

FIG. 8 illustrates a typical hardware configuration of an information handling/computer system in accordance with the invention and which preferably has at least one processor or central processing unit (CPU) 811.

The CPUs 811 are interconnected via a system bus 812 to a random access memory (RAM) 814, read-only memory (ROM) 816, input/output (I/O) adapter 818 (for connecting peripheral devices such as disk units 821 and tape drives 840 to the bus 812), user interface adapter 822 (for connecting a keyboard 824, mouse 826, speaker 828, microphone 832, and/or other user interface device to the bus 812), a communication adapter 834 for connecting an information handling system to a data processing network, the Internet, an Intranet, a personal area network (PAN), etc., and a display adapter 836 for connecting the bus 812 to a display device 838 and/or printer 839 (e.g., a digital printer or the like).

In addition to the hardware/software environment described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, comprising signal-bearing media tangibly embodying a program of machine-readable instructions executable by a digital data processor incorporating the CPU 811 and hardware above, to perform the method of the invention.

This signal-bearing media may include, for example, a RAM contained within the CPU 811, as represented by the fast-access storage for example. Alternatively, the instructions may be contained in another signal-bearing media, such as a magnetic data storage diskette 900 (FIG. 9), directly or indirectly accessible by the CPU 811.

Whether contained in the diskette 900, the computer/CPU 811, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g. CD-ROM, WORM, DVD, digital optical tape, etc.), paper "punch" cards, or other suitable signal-bearing media including transmission media such as digital and analog and communication links and wireless. In an illustrative embodiment of the invention, the machine-readable instructions may comprise software object code.

While the invention has been described in terms of a single preferred embodiment, those skilled in the art will recognize that the invention can be practiced with modification within the spirit and scope of the appended claims.

Having thus described our invention, what we claim as new and desire to secure by Letters Patent is as follows:

1. A method of querying one or more Web-based data sources, said method comprising:

receiving a query statement comprising at least one query;

parsing said query statement to identify a target data source for each said at least one query; and dispatching each said at least one query to a respective one of said data sources for a target data source search at each identified target data source, wherein a format of said query statement further comprises an ability to include an aggregate operator, said aggregate operator defining at least one logical operation to be performed as an aggregate operation on results returned from said target data source searches.

2. The method of claim 1, said method further comprising:

performing said logical operation defined by said aggregate operator on at least one search result returned from said target data sources.

3. The method of claim 2, further comprising:

returning a single search response as an output to a user in response to a multiple-query input.

4. The method of claim 1, wherein a query format of said query statement comprises a Web Services format query in an extensible markup language (XML)-based Universal Description, Discovery and Integration(UDDI) Search Markup Language (USML).

5. The method of claim 1, further comprising:

constructing from said parsed input query statement a format for each said target data source, said constructed format being in a format appropriate for said target data source.

6. The method of claim 1, further comprising:

providing a notification of said dispatching; and providing a result available notice when a search result has been received from said one or more target data sources.

7. The method of claim 1, further comprising:

providing a local UDDI category database to provide a category analysis for determining which of said data sources is to be a target data source.

8. The method of claim 7, wherein said local UDDI category database further provides categories to best filter and narrow said search results.

9. The method of claim 1, wherein said Web-based data sources comprise at least one of:

a Universal Description, Discovery and Integration (UDDI) registry; and a Web Service Inspection Language (WSIL) document for a Web Service.

10. The method of claim 1, wherein a singe search request is dispatched for said query statement regardless of whether a query statement comprises a plurality of queries.

11. The method of claim 1, wherein said at least one query has a query format permitting a plurality of search criteria to be contained in a single query to one of said data sources.

12. A system for optimally querying one or more Web-based data sources, said system comprising:
   an input receiver to receive a query statement comprising at least one query in a Web Service format;
   a parser to parse said input query statement to identify a target data source for each said at least one query; and
   a source dispatcbing broker to dispatch each said at least one query to a respective one of said data sources for a target data source search,
   wherein a format of said query statement further comprises ability to include an aggregate operator, said aggregate operator defining at least one logical operation to be performed on a result returned from said target data source searches.

13. The system of claim 12, said system further comprising:
   an information aggregation and fusion broker to perform said logical operation defined by said aggregate operator on a search result returned from said target data source.

14. The system of claim 12, further comprising:
   a search command construction module to construct from said parsed input query statement a format appropriate for each of said target data sources.

15. The system of claim 12, further comprising:
   a local UDDI category database to provide a category analysis used to determine which of said data sources is to be a target data source.

16. The system of claim 12, wherein said Web-based data sources comprise at least one of:
   a Universal Description, Discovery and Integration (UDDI) registry; and
   a Web Service Inspection Language (WSIL) documeut for Web Service.

17. A signal-bearing medium tangibly embodying a program of machine-readable instructions executable by a digital processing apparatus to perform a method of querying one or more Web-based data sources, said method comprising:
   receiving a query statement comprising at least one query in a Web Service format;
   parsing said query statement to identify a target data source for each said at least one query; and
   dispatching each said at least one query to a respective one of said data sources for a target data source search, wherein a format of said query statement comprises an ability to include an aggregate operator, said aggregate operator defining at least one logical operation to be performed on a result returned from said target data source searches.

18. The signal-bearing medium of claim 17, said method further comprising:
   performing said logical operation defined by said aggregate operator on a search result returned from said target data source.

19. The signal-bearing medium of claim 17, said method further comprising:
   constructing from said parsed input query statement a format for each said target data source, said constructed format being in a format appropriate for said target data source.

20. The signal-bearing medium of claim 17, said method further comprising:
   providing a local UDDI category database to provide a category analysis for determining which of said data sources is to be a target data source.

21. The signal-bearing medium of claim 17, wherein said Web-based data sources comprise at least one of:
   a Universal Description, Discovery and Integration (UDDI) registry; and
   a Web Service Inspection Language (WSIL) documents for a Web Service.

22. A method of querying one or more Web-based data sources, said method comprising:
   receiving a query statement comprising at least one query in a Web Services format;
   parsing said query statement to identify a target data source for each said at least one query, as based upon an information content of said query;
   providing a local UDDI category database to provide a category analysis for at least one of:
      determining which of said data sources is to be a target data source based on an analysis of said parsing; and
      generalizing a category specified in said at least one query;
   preparing at least one query statement addressed to said target data sources identified during said analysis; and
   dispatching each said at least one query to a respective one of said data sources for a target data source search.

23. A method of querying one or more Web-based data sources, said method comprising:
   receiving a query statement comprising at least one query, a query format of said query statement comprising a Web Services format in an extensible markup language (XML)-based Universal Description, Discovery and Integration(UDDI) Search Markup Language (USML);
   parsing said query statement to identity a target data source for each said at least one query; and
   dispatching each said at least one query to a respective one of said data sources for a target data source search.

* * * * *